United States Patent
Niemi

(10) Patent No.: US 9,883,117 B2
(45) Date of Patent: Jan. 30, 2018

(54) METHOD AND APPARATUS FOR CREATING MOTION EFFECT FOR IMAGE

(71) Applicant: Nokia Technologies Oy, Espoo (FI)

(72) Inventor: Sami Niemi, Skanor (SE)

(73) Assignee: Nokia Technologies Oy, Espoo (FI)

( * ) Notice: Subject to any disclaimer, the term of this patent is extended or adjusted under 35 U.S.C. 154(b) by 344 days.

(21) Appl. No.: 14/440,481

(22) PCT Filed: Nov. 6, 2012

(86) PCT No.: PCT/FI2012/051082
§ 371 (c)(1),
(2) Date: May 4, 2015

(87) PCT Pub. No.: WO2014/072567
PCT Pub. Date: May 15, 2014

(65) Prior Publication Data
US 2015/0256763 A1     Sep. 10, 2015

(51) Int. Cl.
*H04N 5/262* (2006.01)
*G06F 3/0488* (2013.01)
(Continued)

(52) U.S. Cl.
CPC ......... *H04N 5/2628* (2013.01); *G06F 3/0412* (2013.01); *G06F 3/0485* (2013.01);
(Continued)

(58) Field of Classification Search
CPC ......... G06F 17/30058; G06F 17/30852; G11B 27/34; H04N 2201/0084; H04N 5/2628
(Continued)

(56) References Cited

U.S. PATENT DOCUMENTS

| | | | | |
|---|---|---|---|---|
| 7,355,620 B2* | 4/2008 | Ikehata | ............... | G06F 3/04883 345/173 |
| 7,885,508 B2* | 2/2011 | Toyoda | ............... | G06F 3/04847 345/173 |

(Continued)

FOREIGN PATENT DOCUMENTS

| | | |
|---|---|---|
| CA | 2737693 | 10/2012 |
| CN | 101308440 | 11/2008 |

(Continued)

OTHER PUBLICATIONS

English Language Abstract of Chinese Patent Application Publication No. CN102713812, published Oct. 3, 2012, 1 page.

(Continued)

*Primary Examiner* — David Harvey
(74) *Attorney, Agent, or Firm* — Locke Lord LLP

(57) ABSTRACT

A method includes maintaining images and associated video streams; detecting a swipe gesture of a user on a touch sensitive display, wherein the swipe gesture comprises direction and speed information; and selecting an image based on the direction information of the swipe gesture. The method includes adjusting a playback of an associated video stream based on the direction and the speed information of the swipe gesture; providing the associated video stream on the display during the swipe gesture, for creating a motion effect relating to the image; and providing the image on the display after the swipe gesture.

17 Claims, 4 Drawing Sheets

(51) Int. Cl.
G06F 3/0485 (2013.01)
G11B 27/10 (2006.01)
G11B 27/34 (2006.01)
G06F 3/041 (2006.01)
G06F 3/0484 (2013.01)
G06T 7/20 (2017.01)
G06T 13/80 (2011.01)
H04N 5/265 (2006.01)
H04N 5/44 (2011.01)
H04N 21/431 (2011.01)
H04N 21/81 (2011.01)
H04N 21/432 (2011.01)
H04N 21/472 (2011.01)
H04N 101/00 (2006.01)

(52) U.S. Cl.
CPC ........ G06F 3/0488 (2013.01); G06F 3/04845 (2013.01); G06T 7/20 (2013.01); G06T 13/80 (2013.01); G11B 27/105 (2013.01); G11B 27/34 (2013.01); H04N 5/265 (2013.01); H04N 5/2625 (2013.01); H04N 5/4448 (2013.01); H04N 21/4318 (2013.01); H04N 21/4325 (2013.01); H04N 21/47217 (2013.01); H04N 21/8153 (2013.01); G06F 2203/04101 (2013.01); G06F 2203/04808 (2013.01); G06T 2207/10004 (2013.01); H04N 2101/00 (2013.01)

(58) Field of Classification Search
USPC ......................................... 348/158
See application file for complete search history.

(56) References Cited

U.S. PATENT DOCUMENTS

| | | | |
|---|---|---|---|
| 7,949,232 B2* | 5/2011 | Toyoda | G06F 3/0362 345/173 |
| 8,239,783 B2 | 8/2012 | Fong et al. | |
| 8,274,592 B2 | 9/2012 | Watkins et al. | |
| 8,732,579 B2* | 5/2014 | Rossmann | G06F 3/04883 715/712 |
| 2006/0203199 A1 | 9/2006 | Shah et al. | |
| 2009/0002335 A1* | 1/2009 | Chaudhri | G06F 3/04815 345/173 |
| 2009/0093275 A1* | 4/2009 | Oh | G06F 3/0482 455/566 |
| 2009/0153389 A1 | 6/2009 | Kerr et al. | |
| 2010/0042642 A1* | 2/2010 | Shahraray | G06F 17/30884 707/756 |
| 2011/0105192 A1* | 5/2011 | Jung | G06F 3/04845 455/566 |
| 2012/0141095 A1 | 6/2012 | Schwesinger et al. | |
| 2012/0262462 A1 | 10/2012 | Montan et al. | |
| 2014/0071068 A1* | 3/2014 | Shih | G06F 3/04883 345/173 |

FOREIGN PATENT DOCUMENTS

| | | |
|---|---|---|
| CN | 102073437 | 5/2011 |
| CN | 102098437 | 6/2011 |
| CN | 102713812 | 10/2012 |
| EP | 1538536 | 6/2005 |
| EP | 1648173 | 4/2006 |
| EP | 2360644 | 8/2011 |
| WO | WO 00/08853 | 2/2000 |
| WO | WO2007070733 | 6/2007 |

OTHER PUBLICATIONS

English Language Abstract of Chinese Patent Application Publication No. CN101308440, published Nov. 19, 2008, 1 page.
English Language Abstract of Chinese Patent Application Publication No. CN102073437, published May 25, 2011, 1 page.
English Language Abstract of Chinese Patent Application Publication No. CN102098437, published Jun. 15, 2011, 1 page.
Extended European Search Report for European Patent Application No. 12888035.8, dated Jun. 22, 2016, 8 pages.
Chinese Search Report for Chinese Patent Application No. 2012800768814, dated Mar. 23, 2017, 3 pages.
International Search Report for International Application No. PCT/FI2012/051082—Date of Completion of Search: Aug. 4, 2013, 5 pages.
PCT Written Opinion of the International Searching Authority for International Application No. PCT/FI2012/051082—Date of Completion of Opinion: Aug. 4, 2013, 7 pages.

* cited by examiner

METHOD AND APPARATUS FOR CREATING MOTION EFFECT FOR IMAGE

TECHNICAL FIELD

The present application generally relates to providing images with motion effect.

BACKGROUND

Nowadays, videos and images are formed and displayed with various apparatuses. Very often, a still image does not provide a motion of a moment in the image for later viewing. It may be that a still image is not enough to reflect the action of a moment. Moving pictures or video streams are often a more lively way to capture memories. However, maintaining long video streams in a memory of the apparatus is not effective and viewing the video streams separately from the still images is not preferred by all users.

The images, or videos, are typically reviewed or displayed after they have been captured for later review of memorable moments. Browsing digital images, like browsing a traditional photo album, can be a rewarding experience and enliven the captured moments. However, a solution is needed to improve the experience by creating a motion effect for the images.

SUMMARY

According to a first example aspect of the invention there is provided an apparatus comprising:
  a touch sensitive display;
  a processor;
  a memory including computer program code;
  the memory and the computer program code configured to, with the processor, cause the apparatus to:
    maintain images and associated video streams;
    detect a swipe gesture of a user on the touch sensitive display, wherein the swipe gesture comprises direction and speed information;
    select an image based on the direction information of the swipe gesture;
    adjust a playback of an associated video stream based on the direction and the speed information of the swipe gesture;
    provide the associated video stream on the display during the swipe gesture, for creating a motion effect relating to the image; and
    provide the image on the display after the swipe gesture.

In an embodiment, the associated video stream comprises a series of video image frames, and the image being comprised by one of the video image frames.

In an embodiment, the associated video stream comprises a series of still images, and the image being comprised by one of the still images.

In an embodiment, the memory and the computer program code further configured to, with the processor, cause the apparatus to:
  maintain a first image and a second image in consecutive order for user browsing; and
  provide a transition from the first image to the second image synchronized with the speed and the direction of the swipe gesture, wherein a video stream associated to the second image displayed during the transition.

In an embodiment, the apparatus further comprises a camera; and the memory and the computer program code further configured to, with the processor, cause the apparatus to:
  capture the images and the associated video streams using the camera.

In an embodiment, the memory and the computer program code further configured to, with the processor, cause the apparatus to:
  provide the first image in a first window on the display; and
  provide the video stream associated to the second image in a second window on the display.

In an embodiment, the first and the second window slide on the display in response to the swipe gesture.

In an embodiment, the memory and the computer program code further configured to, with the processor, cause the apparatus to:
  provide, when no swipe gesture being detected, the first image in a first window on the display; and
  provide, when swipe gesture being detected, the video stream associated to the second image in a second window on the display.

In an embodiment, the memory and the computer program code further configured to, with the processor, cause the apparatus to:
  provide, when swipe gesture being detected, the video stream associated to the first image in the first window on the display.

In an embodiment, the memory and the computer program code further configured to, with the processor, cause the apparatus to:
  maintain a first image and a second image in consecutive order for user browsing; and
  provide a transition from the first image to the second image synchronized with the speed and the direction of the swipe gesture, wherein a video stream associated to the first image displayed during the transition.

In an embodiment, the transition comprises sliding the video stream associated to the second image, into the display, synchronized with the speed and the direction of the swipe gesture and blending into the second image as the swipe gesture is ended.

In an embodiment, adjusting the playback of the associated video stream comprises at least one of the following:
  adjusting a playback speed based on the speed information of the swipe gesture; and
  adjusting a playback direction based on the direction information of the swipe gesture.

In an embodiment, the apparatus further comprises:
  a camera; and
  the memory and the computer program code further configured to, with the processor, cause the apparatus to:
    capture a plurality of consecutive images using the camera;
    select an image of the plurality of consecutive images; and
    generate the associated video stream for the selected image using at least two of the plurality of consecutive images.

In an embodiment, the selected image is one of the following:
  a first image of the plurality of consecutive images;
  an intermediate image of the plurality of consecutive images; and
  a last image of the plurality of consecutive images.

In an embodiment, selecting the image of the plurality of consecutive images is done by the user.

According to a second example aspect of the invention there is provided a method comprising:
  maintaining images and associated video streams;
  detecting a swipe gesture of a user on a touch sensitive display, wherein the swipe gesture comprises direction and speed information;
  selecting an image based on the direction information of the swipe gesture;
  adjusting a playback of an associated video stream based on the direction and the speed information of the swipe gesture;
  providing the associated video stream on the display during the swipe gesture, for creating a motion effect relating to the image; and
  providing the image on the display after the swipe gesture.

According to a third example aspect of the invention there is provided a computer program embodied on a computer readable medium comprising computer executable program code which, when executed by at least one controller of an apparatus, causes the apparatus to:
  maintain images and associated video streams;
  detect a swipe gesture of a user on a touch sensitive display, wherein the swipe gesture comprises direction and speed information;
  select an image based on the direction information of the swipe gesture;
  adjust a playback of an associated video stream based on the direction and the speed information of the swipe gesture;
  provide the associated video stream on the display during the swipe gesture, for creating a motion effect relating to the image; and
  provide the image on the display after the swipe gesture.

According to a fourth example aspect of the invention there is provided a memory medium comprising the computer program of the third example aspect.

Any foregoing memory medium may comprise a digital data storage such as a data disc or diskette, optical storage, magnetic storage, holographic storage, opto-magnetic storage, solid state memory, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION OF THE DRAWINGS

In the following description, like numbers denote like elements.

Figure 1A:
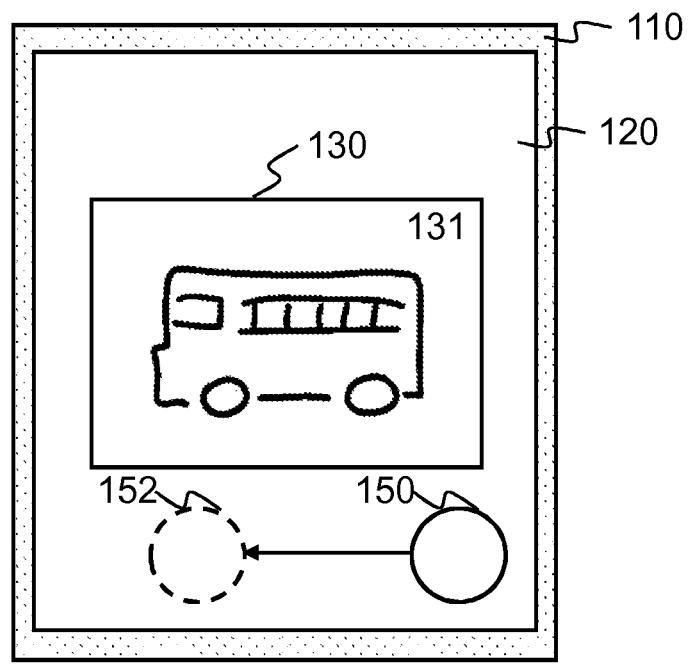
FIG. 1a shows a schematic picture of a normal mode of an apparatus of an example embodiment of the invention.

FIG. 1a shows a schematic picture of a normal mode of an apparatus 110 of an example embodiment of the invention. The apparatus 110 comprises a touch-sensitive surface such as a touch-sensitive display 120. The touch-sensitive display 120 may be of different size and based on a variety of technologies.

The apparatus 110 may be held and operated in a vertical mode or a landscape mode. The touch-sensitive display 120 is configured to display information to a user of the apparatus 110. Furthermore, the apparatus 110 comprises a detector configured to detect a touch point of the user on the touch sensitive display 120. The touch sensitive display 120 comprises a predetermined viewing area such as a window 130 for an image 131. A plurality of windows 130 may be displayed on the touch-sensitive display 120.

In an embodiment, the user may touch the display 120 in a certain location. Such location is represented as a touch point 150. The touch point 150 may be determined using the detector of the apparatus 110. In case the touch point 150 is located over a predetermined active area of the display 120, a swipe gesture may be detected. As a default the active area may comprise whole area of the display 120. The user may provide a second touch point 152 on the touch sensitive display 120 in a similar fashion as described for the first touch point 150. The user may release his finger from the touch sensitive display 120 between the first and the second touch points 150-152 or the user may sweep his finger between the points 150-152, for example. In FIG. 1a, a swipe gesture between a start point 150 and an end point 152 is illustrated. Based on the detected swipe gesture, speed information and direction information for the swipe gesture may be determined. The speed information for the swipe gesture may be determined based on the start point 150 and the end point 152, the distance of the two points and time used for the movement. Similarly, the direction and the speed information may be determined on the fly all the time the user is touching the touch-sensitive display.

Figure 1B:
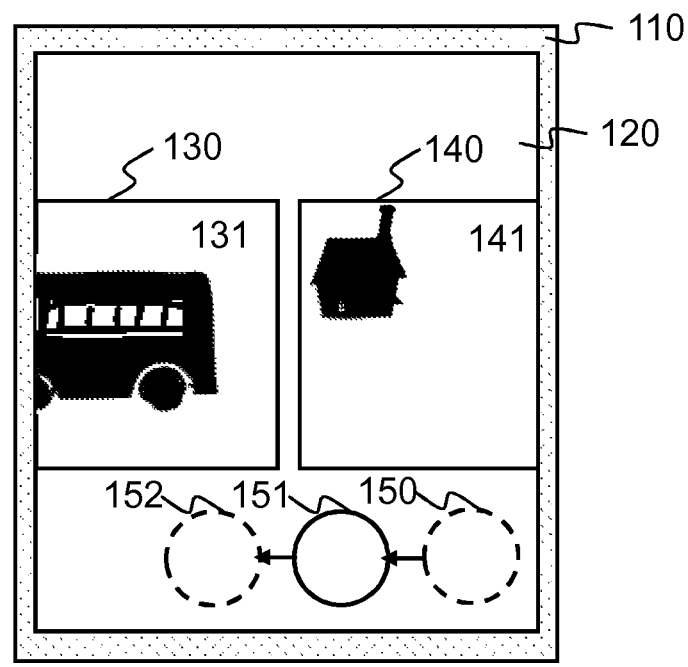
FIG. 1b shows a schematic picture of a transition mode of an apparatus according to an example embodiment of the invention.

FIG. 1b shows a schematic picture of a transition mode of an apparatus 110 according to an example embodiment of the invention. User may have started touching the touch-sensitive display 120 on a first touch point 150, for example using a finger. Movement of user's touch point from the first touch point 150 to and intermediate touch point 151 is illustrated. In the moment of user's touching the intermediate touch point 151, a swipe gesture has been detected based on the touch points 150, 151. The detected swipe gesture comprises direction information and speed information. The direction information in FIG. 1b may be detected based on the touch points 150, 151 to comprise "left" as a direction. Similarly the speed information may be detected based on the touch points 150, 151 and time used for such movement. The speed information may then be converted to frames/s, mm/s or pixels/s, for example, using some pre-defined mapping, for example. Thus the speed information may be used for adjusting playback of a video stream.

In an embodiment, the detected swipe gesture in FIG. 1*b* comprises swipe gesture information of "left" as direction information and "S" as speed information. Based on the direction information "left" the apparatus 110 is configured to determine that a next image in the image gallery is desired for viewing on the display 120 after the previous image 131. The image 131 may be presented in a window 130 and the next image may be presented in a window 140, for example. The windows 130, 140 may be next to each other or with a certain gap between the windows 130, 140. In an embodiment only one window 130, 140 may be used in which window the images 131 are viewed and moved, In the example status of FIG. 1*b* when the user is reaching the intermediate touch point 151, the previous image 131 is already sliding to the left and partially disappearing from the display 120 in response to the detected swipe gesture. Correspondingly the next image window 140, following the previous image 131 of the image folder being viewed, is sliding from the right to the display 120. As long as the swipe gesture is not complete and the window 140 is not displayed totally in the display 120, a video stream 141 associated to the next image may be provided in the window 140. The speed of the video stream playback may depend on the speed of the user's finger between the touch points 150-152. The direction of the video stream playback may depend on the movement direction of the user's finger between the touch points 150-152. Direction right→left may correspond to forward playback and direction left→right may correspond to reverse playback, for example. Once the swipe gesture is complete, the video stream in window 141 is replaced by the image to which the associated video stream 141 is shown. Typically the video stream is captured just before the actual image to which the video stream is associated. Alternatively the image may be any of the video image frames captured during the video stream capturing. Thus, the image may be in the middle of the video stream or in the beginning of the stream as well, for example.

In an embodiment, an associated video stream may comprise a sequence of still images. Such sequence of still images may be captured using a camera of an apparatus. The sequence of still images for the associated video stream may be captured just before capturing the image that the video stream is associated. Either same camera may be used or different cameras may be used for the video stream image capturing and the image capturing that the video stream is associated. Resolution of the sequence of still images for the video stream may be lower than the image the video stream is associated.

In an embodiment, based on the swipe gesture detected between the touch points 150-152 a video stream may be provided in a window 140 during the swipe gesture. As long as the user swipes a finger on the display 120 to provide a continuous swipe gesture, the windows 130, 140 move on the display 120 to corresponding direction. Similarly, a next image window 140 provides a video stream 141 relating to the next image to be shown. Both speeds for the image windows 130, 140 sliding on the display 120 and the speed of video stream 141 playback in the window 140 may depend on the detected speed information based on the swipe gesture.

In an embodiment, the user may adjust the preferences for sweep gesture detection, direction information and speed information to optimize the usability.

In an embodiment, the user has captured a first still image 131, a first video stream associated to the first image 131, a second still image and a second video stream 141 associated to the second still image. The images and the associated video streams are stored to a memory of an apparatus 110. Alternatively the images and video streams may have been captured by another apparatus and/or a user but transferred to the apparatus 110 for viewing. The user may browse the media gallery comprising images and video streams with a browser, for example. In normal viewing mode when the user does not touch the display 120, a window 130 comprising the first image 131 is shown, as in FIG. 1*a*. When the user wants to browse to the second image, a swipe gesture 150-152 is started. During the transition mode, as in FIG. 1*b*, the swipe gesture is on the way and user's finger has moved from point 150 to point 151, roughly in the middle of the gesture between points 150-152. In this phase, the first image 131 comprised by the window 130 is already moved to the left and being only partially visible on the display 120. Correspondingly, the second window 140 comprising the video stream 141 associated to the second image is partially visible on the right.

Based on the detected swipe gesture 150-151 the direction and the speed information may be defined. The direction information indicates moving to the left and thus referring to the next image in order, which is the second image. In the transition/intermediate phase the associated video stream 141 is shown in the window 140, that is the video stream 141 associated to the second image. Thus the second image may be selected based on the direction information of the swipe gesture. Furthermore, the moving speed of windows 130, 140 as well as the playback speed of the video stream associated to the second image may be adjusted based on the speed information of the swipe gesture. Playback direction (forward/reverse) may be determined based on the direction information of the swipe gesture. Providing the video stream associated to the second image enables providing of a motion effect relating to the second image. When the swipe gesture is finished in the touching point 152, the first image 131 and/or the window 130 is moved so far to the left that it is disappeared and the second window 140 is fully visible on the display 120. The video stream 141 provided in the second window 140 on the display 120 may end when the window 140 is fully visible. When the user ends the swipe gesture by removing the finger from the display 120, the second image may be shown in the window 140. Alternatively, the second image may be shown in the end of the associated video stream no matter the user still touches the display.

In an embodiment, the images may comprise higher resolution images than image frames of the video stream.

In an embodiment, the associated video stream may be captured prior to capturing the image. The video stream may comprise for example 1-2 second duration stream for providing motion effect for the still image captured. When the user browses images on the display 120, the video stream associated to the image may be played when swiping in the image. The video stream 141 may end with the real image that the stream being associated to. Such solution creates the effect that the image is alive and more of a motion moment may be captured and presented to the viewing user.

In an embodiment, in transition phase of FIG. 1*b*, a first video stream associated to a first image may be provided in a first window 130 and a second video stream 141 associated to a second image may be provided in a second window 140 during transition based on the detected swipe gesture.

Linking a user swipe gesture to an associated video stream of a still image provides a number of advantages. First, the user is provided a motion effect associated to a still image and liveliness of the high quality still image is enhanced. Second, the browsing of images and associated video streams is reactive to user provided swipe gestures. Such feature provides user an active role in browsing the images and associated video streams instead of just providing them to the user in separate windows on the display simultaneously. Third, the swipe gesture by the user directly controls the playback of the video stream. By moving the finger left and right, the user may control the playback direction of the video stream and by adjusting the speed of the finger, the playback speed is adjusted, In an embodiment, a capturing mode for motion effect may be activated and disabled by the user via user settings of the apparatus, for example. Such setting between motion effect capture mode and normal mode is useful if the user would like to avoid associated video stream capturing for saving battery and/or memory usage.

In an embodiment, when a motion effect capturing mode of the apparatus is enabled, the apparatus may automatically analyze the associated video streams captured. In case there is no movement detected in the associated video streams when analyzed, the associated video streams may be automatically deleted and only the still image related to the video stream is stored to the memory of the apparatus. By doing this, associated video streams that comprise only static objects in a target scene may be removed because they do not provide a desired motion effect and may consume the available memory.

In an embodiment, an associated video stream may be captured when the user presses a shutter-release button of a camera apparatus. The capture may start when the user presses the button. Even a half-way press of the button for autofocusing for still image may be used to trigger the video recording. The capture may end when the user has pushed the button to bottom and released it. Such mechanism may enable at least 1 second video stream and typically 1-3 seconds. Such length for an associated video stream may provide the desired motion effect for the still image captures at the same time when the button is pressed to the bottom. When playing the associated video stream, the playback speed depends on the swipe gesture speed so the user is able to control the motion effect in an enhanced way.

In an embodiment, a motion effect relating to an image may be provided when transiting from a grid view of images to larger representation of the image, such as full-screen. In the grid view a plurality of images may be provided and based on user action a selected image may be presented in larger mode, such as full-screen. When starting from a grid view of images a swipe gesture of a user may be detected on the touch sensitive display, wherein the swipe gesture comprises direction and speed information. The touch gesture may be started by starting a pinch to zoom-in gesture on a certain image in the grid view. Direction information of the gesture may correspond to the pinch to zoom-in direction (zoom-in), for example. Speed of the gesture may correspond to the pinch to zoom-in speed. Similarly, the direction information of the gesture may correspond to the pinch to zoom-out direction (zoom-out) and the speed of the gesture may correspond to the pinch to zoom-out speed. An image in the grid may be selected based on the direction information of the swipe gesture, such as the pinch to zoom-in. A playback of an associated video stream may be adjusted based on the direction and the speed information of the swipe gesture, such as the pinch to zoom-in and the speed of the pinch to zoom-in. In transition phase when pinching to zoom-in, the associated video stream may be provided on the display during the pinching swipe gesture, for creating a motion effect relating to the selected image. The image may be provided on the display after finishing the pinching swipe gesture. Similarly, when pinching to zoom-out, an associated video stream may be provided when transiting from a larger representation mode, such as full-screen, to a grid view.

In an embodiment, a grid view of images may be provided for each image having an associated video stream. The grid view may comprise a plurality of images captured sequentially relating to same scene. The plurality of images in the grid view may comprise the actual still image as a last image in the grid, for example. The other images in the grid view before the last image thus comprise a sequence of still images and may be used as an associated video stream for the last image. A motion effect relating to the last image may be thus provided when transiting from a grid view of images to larger representation of the last image, such as full-screen. When starting from a grid view of images a swipe gesture of a user may be detected on the touch sensitive display, wherein the swipe gesture comprises direction and speed information. The touch gesture may be started by starting a pinch to zoom-in gesture on the grid view. Direction information of the gesture may correspond to the pinch to zoom-in direction (zoom-in), for example. Speed of the gesture may correspond to the pinch to zoom-in speed. Similarly, the direction information of the gesture may correspond to the pinch to zoom-out direction (zoom-out) and the speed of the gesture may correspond to the pinch to zoom-out speed. The last image in the grid may be selected based on the direction information of the swipe gesture, such as the pinch to zoom-in. Similarly, the first image in the grid may be selected based on the direction information of the swipe gesture, such as the pinch to zoom-out. A playback of an associated video stream comprising the other images of the grid may be adjusted based on the direction and the speed information of the swipe gesture, such as the pinch to zoom-in and the speed of the pinch to zoom-in. In transition phase when pinching to zoom-in, the associated video stream may be provided on the display during the pinching swipe gesture, for creating a motion effect relating to the last (or first) image. The image may be provided on the display after finishing the pinching swipe gesture. Similarly, when pinching to zoom-out, an associated video stream may be provided when transiting from a larger representation mode, such as full-screen, to a grid view.

In an embodiment, a touch-sensitive display may be able to detect user's finger before the user actually touches the display. In such a case, a swipe gesture of a user on the touch sensitive display may be detected at least partially without the user touching the touch-sensitive display. For example, the swipe gesture may start before touching the display and at least one of the direction information and the speed information of the swipe gesture may be detected.

Figure 2:
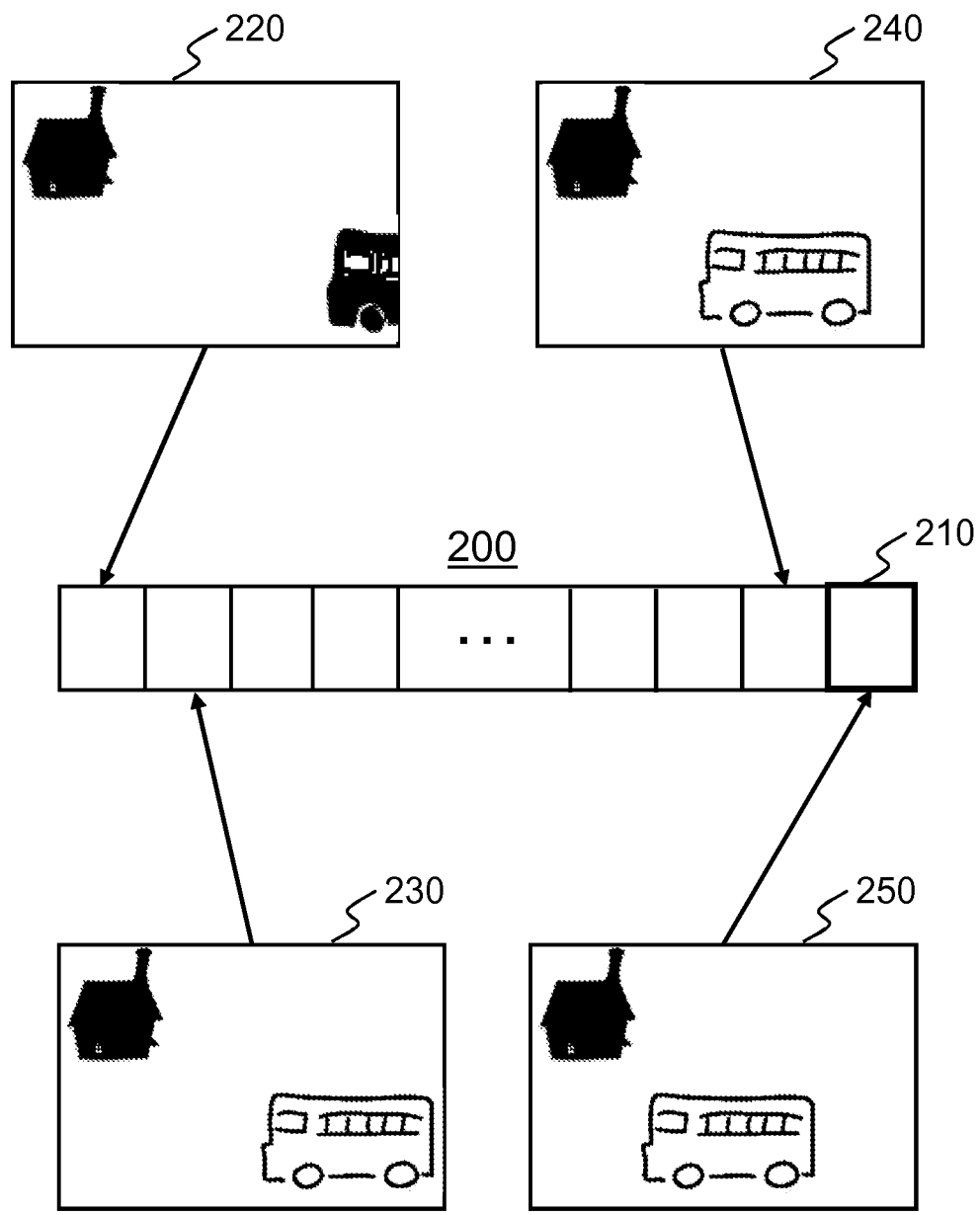
FIG. 2 shows a schematic picture of a plurality of images comprising an image and an associated video stream according to an example embodiment of the invention.

FIG. 2 shows a schematic picture of a plurality of images 200 comprising an image and an associated video stream according to an example embodiment of the invention.

The plurality of images 200 may be captured consecutively by the user apparatus or transmitted from a capturing apparatus for browsing in the user apparatus. To provide a motion effect for a still image 250, a video stream is captured. In the example of FIG. 2 the video stream is captured just before capturing the image 250 but the video stream capturing may also take place after the image capturing or the image capturing may take place in the middle of video stream capturing.

In an embodiment, the associated video stream for the image 250, comprises n video image frames from a first video image frame for image 220 to a last video image frame for image 240. Not all images 220-240 need to be included to the video stream but only some of them. The actual image 250 that the video stream is associated to is illustrated as the last frame 210 in the end of the plurality of images 200. Such set illustrates a situation where the associated video stream 220-240 is captured just before capturing the image 250. The number of images 220-240 for the associated video stream depends on the capturing speed (e.g. frames/second) of the camera and the length of capturing. All images 200 may be of same image quality or alternatively the video image frames for images 220-240 may be of lower quality for motion effect and the final frame 210 of the still image 250 being of higher quality and resolution.

When browsing the images and based on the swipe gesture, an image 250 is selected for displaying next, associated video stream 220-240 is displayed during the transition phase when the swipe gesture is active. The image 250 may comprise a link to the associated video stream 220-240. The link may be utilized by metadata of the image 250 or via an association link by a browser application of the apparatus.

The motion effect created by the associated video stream 220-240 enhances the still image 250. The user would like to capture a scene of the house together with the bus driving by, for example. The motion effect created by the moving bus will be provided to the user when swiping the gesture on the display before ending up to the desired still image 250.

The video stream of consecutive images 220-240 may be only 0.5 s-1 s long, to provide motion effect to the last image 250 that the video stream 220-240 is associated. The sequence of consecutive images 220-240 may be captured just before capturing the final image 250. The resolution of the final image 250 may be higher that the sequence of consecutive images 220-240.

In an embodiment, a plurality of images 200 may be captured. Based on the captured images an image 250 is selected for which a motion effect is provided using an associated video stream. The image 250 may be selected by a user and the image 250 may comprise any image of the plurality of images 200. The associated video stream may be generated using at least two of the remaining plurality of images 200. In case the selected image 250 is not the last frame 210 of the plurality of the images 200, the images 220-240 selected for the associated video stream may be selected so that they precede the selected image 250 so that the motion effect ends naturally to the selected image 250.

In an embodiment, a first image 220 of a plurality of consecutive images 200 may be selected as the image to which the motion effect is created. In such embodiment, at least two of the images 230-250 may be used to generate an associated video stream for the image 220.

Figure 3:
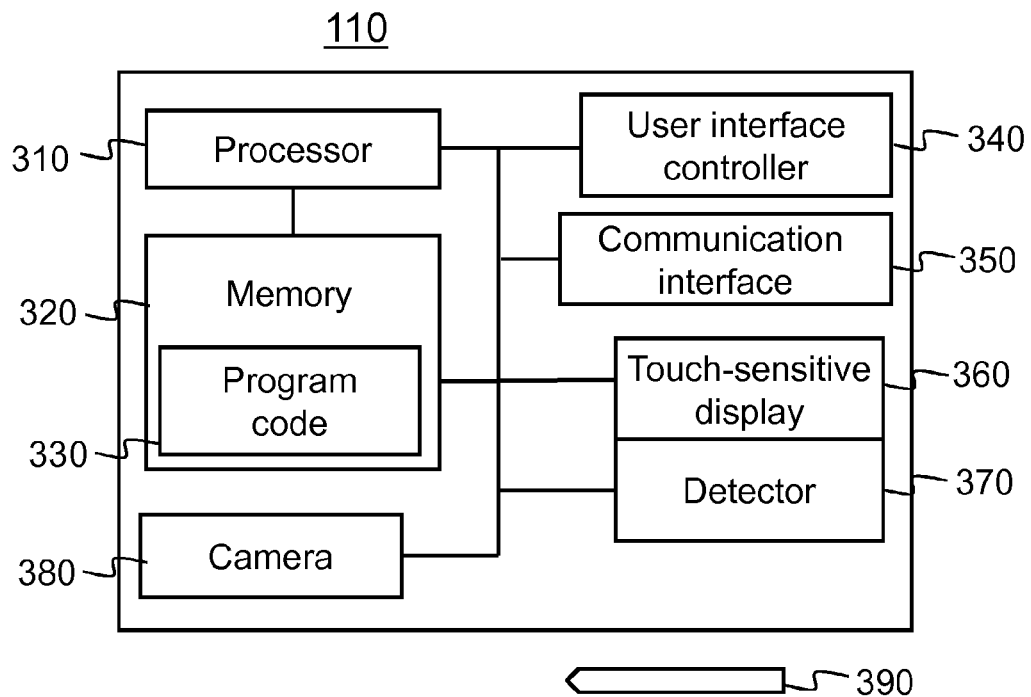
FIG. 3 shows an example block diagram of an apparatus in which various embodiments of the invention may be applied.

FIG. 3 presents an example block diagram of an apparatus 110 in which various embodiments of the invention may be applied. The apparatus 110 may be a user equipment (UE), user device or apparatus, such as a mobile terminal, a smart phone, a personal digital assistant (PDA), a laptop, a tablet or a communication device.

The general structure of the apparatus 110 comprises a user interface controller 340, a touch-sensitive display 360, a detector 370 for sensing touch points, a communication interface 350, a camera 380, a processor 310, and a memory 320 coupled to the processor 310. The apparatus 110 further comprises software 330 stored in the memory 320 and operable to be loaded into and executed in the processor 310. The software 330 may comprise one or more software modules and can be in the form of a computer program product.

The processor 310 may be, e.g., a central processing unit (CPU), a microprocessor, a digital signal processor (DSP), a graphics processing unit, or the like. FIG. 3 shows one processor 310, but the apparatus 110 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 110 may comprise a plurality of memories. The memory 320 may be constructed as a part of the apparatus 110 or it may be inserted into a slot, port, or the like of the apparatus 110 by a user. The memory 320 may serve the sole purpose of storing data, or it may be constructed as a part of an apparatus serving other purposes, such as processing data. Images and associated video streams may be stored to the memory 320.

In an example embodiment, images, or image files, and video streams, or video stream files, are stored in the memory 320. In an example embodiment the images comprise image data and associated data such as video stream. In a further example embodiment the associated data is linked to the image data or comprised in or integrated with the image data as a kind of metadata. The apparatus 110 may further comprises a camera 380 coupled to the processor. In an example embodiment, the apparatus 110 does not comprise a camera 380 and the images and video streams are transferred and stored to the memory from an external device.

The user interface controller 340 may comprise circuitry for receiving input from a user of the apparatus 110, e.g., via a keyboard, graphical user interface shown on the display of the user apparatus 110, speech recognition circuitry, or an accessory device, such as a headset, and for providing output to the user via, e.g., a graphical user interface or a loudspeaker.

The touch-sensitive display 360 may be for example a liquid crystal display (LCD) or a light-emitting diode (LED) based display. The detector 370 may be integrated to the touch-sensitive display 360 as a touch-sensitive surface of a touch display or a touch screen. The detector 370 may also be included as a separate element, for example as a touchpad.

In an embodiment, a variety of touch-sensitive display technologies may be used for the apparatus 110.

A resistive touchscreen panel may be used, which panel is composed of several layers, the most important of which are two thin, electrically conductive layers separated by a narrow gap. When an object, such as a finger, presses down on a point on the panel's outer surface, the two metallic layers become connected at that point and the panel then behaves as a pair of voltage dividers with connected outputs. Thus, a change is caused in the electrical current, which is registered as a touch event and sent to the controller for processing. The cover sheet consists of a hard outer surface with a coated inner side. Touching the outer layer causes the conductive layers to touch, creating a signal that the analog controller can interpret and determine what the user wants to be done.

Surface acoustic wave (SAW) technology may be used, which technology using ultrasonic waves passing over the touchscreen panel. When the panel is touched, a portion of the wave is absorbed. This change in the ultrasonic waves registers the position of the touch event and sends such information to the controller for processing.

Capacitive touchscreen panel may be used, which panel consists of an insulator such as glass, coated with a transparent conductor such as indium tin oxide (ITO). As the human body is also an electrical conductor, touching the surface of the screen results in a distortion of the screen's electrostatic field, measurable as a change in capacitance. Different technologies may be used to determine the location of the touch. The location is sent to the controller for processing. Unlike a resistive touchscreen, one cannot use a capacitive touchscreen through most types of electrically insulating material, such as gloves but one requires a special capacitive stylus, or a special-application glove with an embroidered patch of conductive thread passing through it and contacting the user's fingertip.

Surface capacitance may be used, in which only one side of the insulator is coated with a conductive layer. A small voltage is applied to the layer, resulting in a uniform electrostatic field. When a conductor, such as a human finger, touches the uncoated surface, a capacitor is dynamically formed. The sensor's controller can determine the location of the touch indirectly from the change in the capacitance as measured from the four corners of the panel.

Projected Capacitive Touch (PCT) technology may be used, in which a capacitive technology permits more accurate and flexible operation, by etching the conductive layer. An X-Y grid is formed either by etching a single layer to form a grid pattern of electrodes, or by etching two separate, perpendicular layers of conductive material with parallel lines or tracks to form the grid (comparable to the pixel grid found in many LCD displays). The greater resolution of PCT allows operation without direct contact, such that the conducting layers can be coated with further protective insulating layers, and operate even under screen protectors, or behind weather- and vandal-proof glass.<Due to the top layer of a PCT being glass, PCT is a more robust solution versus resistive touch technology. Depending on the implementation, an active or passive stylus can be used instead of or in addition to a finger. This is common with point of sale devices that require signature capture. Gloved fingers may or may not be sensed, depending on the implementation and gain settings.

Mutual capacitance may be used. In mutual capacitive sensors, there is a capacitor at every intersection of each row and each column. A 16-by-14 array, for example, would have 224 independent capacitors. A voltage is applied to the rows or columns. Bringing a finger or conductive stylus close to the surface of the sensor changes the local electrostatic field which reduces the mutual capacitance. The capacitance change at every individual point on the grid can be measured to accurately determine the touch location by measuring the voltage in the other axis. Mutual capacitance allows multi-touch operation where multiple fingers, palms or styli can be accurately tracked at the same time.

Self-capacitance sensors may be used, having the same X-Y grid as mutual capacitance sensors, but the columns and rows operate independently. With self-capacitance, the capacitive load of a finger is measured on each column or row electrode by a current meter.

The communication interface module 350 implements at least part of radio transmission. The communication interface module 350 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 350 may be integrated into the user apparatus 110, or into an adapter, card or the like that may be inserted into a suitable slot or port of the apparatus 110. The communication interface module 350 may support one radio interface technology or a plurality of technologies. The apparatus 110 may comprise a plurality of communication interface modules 350. Image data and video stream data may be transmitted and received to/from a network using the communication interface 350.

A skilled person appreciates that in addition to the elements shown in FIG. 3, the apparatus 110 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 110 may comprise a disposable or rechargeable battery (not shown) for powering when external power if external power supply is not available.

Furthermore, an actuator 390, for example a stylus, may be used to operate the apparatus 110 instead of a user's finger.

Figure 4:
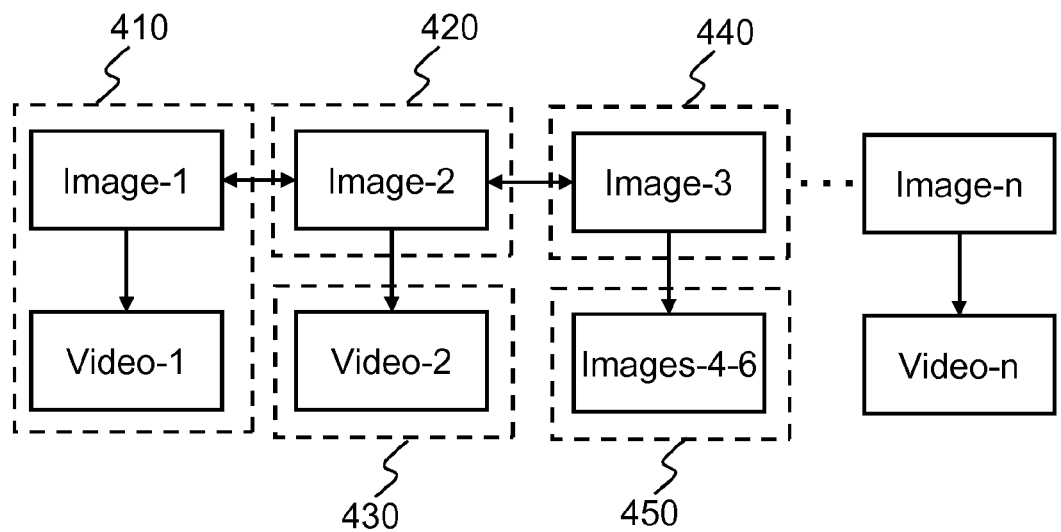
FIG. 4 shows a schematic block representation of images and video streams used in an example embodiment of the invention.

FIG. 4 shows a schematic block representation of images and video streams used in an example embodiment of the invention. An image file may comprise both image data and video stream data. Alternatively, the image data and the video stream data may be separate files linked together. Video stream may also comprise linked still images. Order of images, like Image-1→Image-2→Image-3 may be utilized using metadata of the image files 410, 420, 440, for example, or by maintaining linking information within an apparatus by a browser application.

In an embodiment, an image file 410 comprises image data (Image-1) and video stream data (Video-1). The image file is an integrated file comprising image data and video stream as a kind of metadata, for example.

In an embodiment, an image file 420 comprise image data (Image-2) and a link is provided to a video stream file 430 comprising associated video stream data (Video-2). The link may be comprised by a metadata of the image file 420 or maintained by linking information of the browser application.

In an embodiment an image file 440 may be a separate file comprising the image data (Image-3) comprising a link to a plurality of image files 450. The link may be comprised by a metadata of the image file 440 or maintained by linking information of the browser application. The plurality of linked images 450 may create the video stream associated to the image 440 and provide the motion effect.

In an example embodiment, video stream data and association to image data is created when the image file is created or stored into the memory. In a further example embodiment, the video stream data is created or updated when needed, e.g. when an edited version of the image is created, or a sequence of images providing the video stream is amended. In a further example embodiment, the association data may be edited by a user.

In an embodiment, the photo browser displaying the images handles the images in a kind of endless loop, i.e. the user of the apparatus may move to either direction from each displayed image. The user of the apparatus indicates her wish to view the next image e.g. with the user interface by swiping the touch sensitive display with her finger, i.e. by moving her finger on the touch sensitive display. The touch sensitive display recognizes or detects the direction and speed of the swipe, i.e. detects the position of the finger during the swipe gesture on the screen or in proximity thereof. While swiping can thus be performed by moving a finger on the screen or in the proximity of the screen, the swiping can alternatively be performed according to a further example embodiment by using e.g. a pointing device.

The image being displayed on the touch sensitive display is shifted in accordance with, or synchronized with the, the swiping gesture. During the shift, the transition of both image windows (previous-next) is displayed synchronized with the speed and direction of the swipe gesture. The associated video stream of the next image may be presented in a second image window sliding in to the display, while the previous image may be presented in a first image window sliding out from the display.

In an example embodiment, the user may change the direction of the swipe during the shift and the direction the images slide and the direction of the video stream playback being displayed is changed accordingly, i.e. the user can choose to return to the first image after having seen a part of the video stream associated to the second image on the display. Furthermore, a skilled person appreciates that in a further example embodiment, the transitions are displayed also when the images are shifted automatically, for example in an automatic slide show mode.

In an embodiment, the first image window slides away from the display and the second image window, i.e. the video stream associated to the second image adjacent to the first image, slides into the display synchronized with the swipe movement, i.e. the direction and speed of the swipe. In an example embodiment, the first image slides away in the direction of the swipe and the second image window slides into the display in the direction of the swipe, or as if being pulled into the display by the finger. During the shift a part of both image windows is displayed, as the first image window slides away and the second image window slides into the display. On shifting the first and second image windows, while synchronized with the swipe movement, the speed of the first and second image windows can be slightly changed in one example embodiment e.g. so that the first image window appears to move first and pull or push the second image window with some elasticity so that the distance of the image windows may at least temporarily change and/or the image windows may temporarily overlap.

If an image contains no associated video stream, the transition that is determined is that when the image is shifted as hereinbefore described, the image with no video stream data merely slides into the display following the speed and direction of the swipe gesture as hereinbefore described, with no special effects. and, in a further example embodiment, the transition is carried out in a conventional manner, e.g. with a blur-transfer, with a fly in-transfer, by zooming in and/or out or with a further predefined effect or with any combination thereof, again synchronized with the speed and direction of the swipe gesture.

In an embodiment, image files 410-450 may be captured and generated by a first apparatus comprising a camera. The image files 410-450 may be transmitted to a second apparatus or to a server. The image files 410-450 may be received by the second apparatus and the described embodiments of a swipe gesture based motion effect for an image provided.

Figure 5:
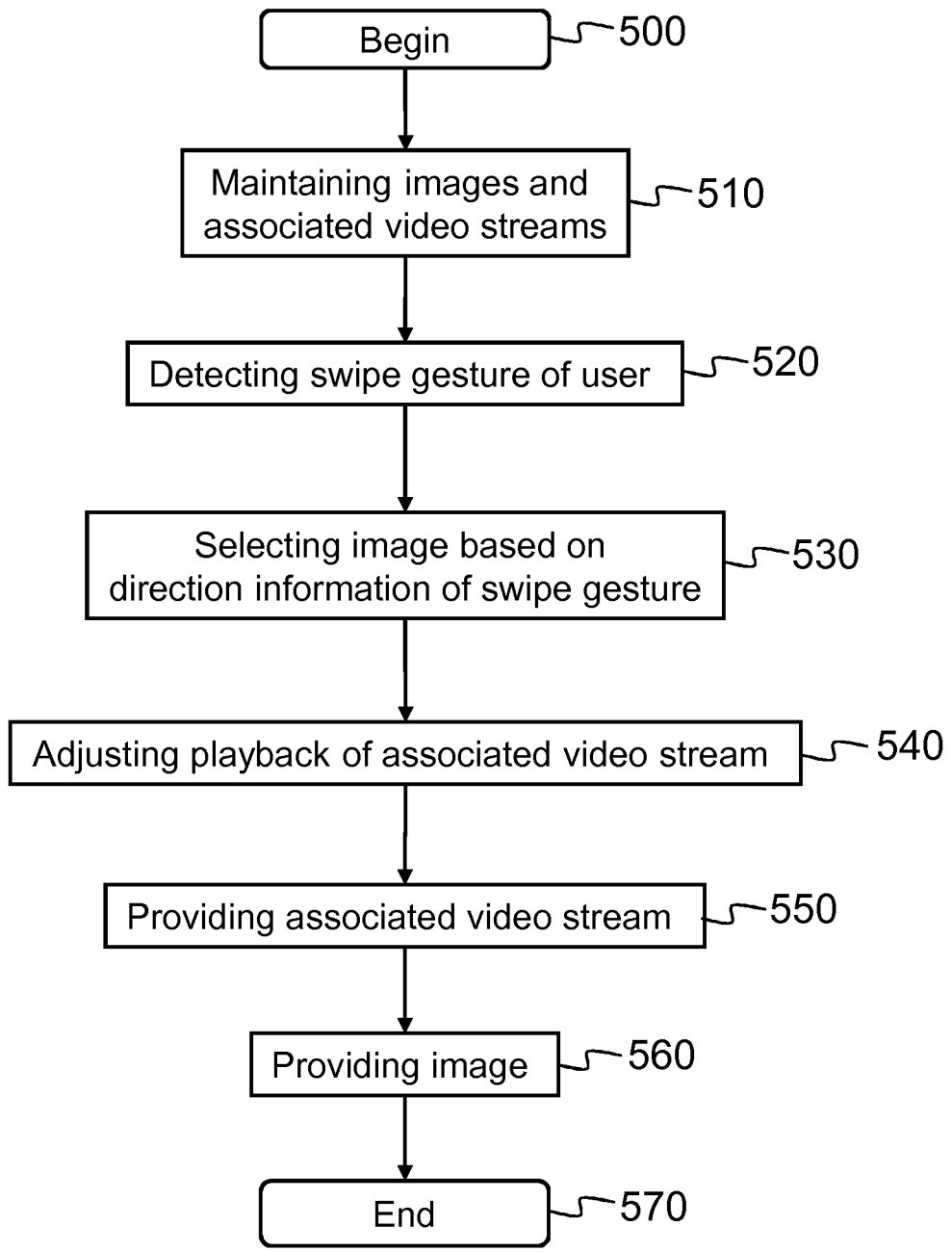
FIG. 5 shows a flow diagram showing operations in accordance with an example embodiment of the invention.

FIG. 5 shows a flow diagram showing operations in accordance with an example embodiment of the invention.

In step 500, the method is started. In step 510, images and associated video streams are maintained. In step 520, a swipe gesture of a user is detected on a touch sensitive display, wherein the swipe gesture comprises direction and speed information. In step 530, an image is selected based on the direction information of the swipe gesture. In step 540, a playback of an associated video stream is adjusted based on the direction and the speed information of the swipe gesture. In step 550, the associated video stream is provided on the display during the swipe gesture, for creating a motion effect relating to the image. In step 560, the image is provided on the display after the swipe gesture is ended. The method ends in step 570.

Without in any way limiting the scope, interpretation, or application of the claims appearing below, a technical effect of one or more of the example embodiments disclosed herein is the simple integration of a motion effect for still images utilizing a swipe gesture. Another technical effect of one or more of the example embodiments disclosed herein is the enhancement of the user-experience by an enlivened photo browsing experience. Another technical effect of one or more of the example embodiments disclosed herein is that the photo browsing allows the effects that enhance the memorable moments to be shown. Another technical effect of one or more of the example embodiments disclosed herein is that the photo browsing becomes alive, as the motion effect that the user has desired with the original moments is shown.

If desired, the different functions discussed herein may be performed in a different order and/or concurrently with each other. If desired, user input may be received or given at any time or concurrently with other functions. Furthermore, if desired, one or more of the previously described functions may be optional or may be combined.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus, comprising:
 a touch sensitive display;
 a processor;
 a memory including computer program code;
 the memory and the computer program code configured to, with the processor, cause the apparatus to:
  maintain images comprising a first image and a second image in consecutive order for user browsing and associated video streams;

detect a swipe gesture of a user on the touch sensitive display, wherein the swipe gesture comprises direction and speed information;

select the second image based on the direction information of the swipe gesture;

provide a transition from the first image to the second image synchronized with the speed and the direction of the swipe gesture, wherein a video stream associated to the second image is displayed during the transition;

adjust a playback of the associated video stream based on the direction and the speed information of the swipe gesture;

provide the associated video stream on the display during the swipe gesture, for creating a motion effect relating to the second image; and provide the second image on the display after the swipe gesture.

2. The apparatus of claim 1, wherein the associated video stream comprises a series of video image frames, and the second image being comprised by one of the video image frames.

3. The apparatus of claim 1, wherein the associated video stream comprises a series of still images, and the second image being comprised by one of the still images.

4. The apparatus of claim 1, further comprising:
a camera; and
the memory and the computer program code further configured to, with the processor, cause the apparatus to:
capture the images and the associated video streams using the camera.

5. The apparatus of claim 1, wherein
the memory and the computer program code further configured to, with the processor, cause the apparatus to:
provide the first image in a first window on the display; and
provide the video stream associated to the second image in a second window on the display.

6. The apparatus of claim 5, wherein the first and second window slide on the display in response to the swipe gesture.

7. The apparatus of claim 1, wherein
the memory and the computer program code further configured to, with the processor, cause the apparatus to:
provide, when no swipe gesture being detected, the first image in a first window on the display; and
provide, when swipe gesture being detected, the video stream associated to the second image in a second window on the display.

8. The apparatus of claim 7, wherein
the memory and the computer program code further configured to, with the processor, cause the apparatus to:
provide, when swipe gesture being detected, the video stream associated to the first image in the first window on the display.

9. The apparatus of claim 1, wherein
the memory and the computer program code further configured to, with the processor, cause the apparatus to:
maintain a first image and a second image in consecutive order for user browsing; and
provide a transition from the first image to the second image synchronized with the speed and the direction of the swipe gesture, wherein a video stream associated to the first image displayed during the transition.

10. The apparatus of claim 1, wherein the transition comprises sliding the video stream associated to the second image, into the display, synchronized with the speed and the direction of the swipe gesture and blending into the second image as the swipe gesture is ended.

11. The apparatus of claim 1, wherein adjusting the playback of the associated video stream comprises at least one of the following:
adjusting a playback speed based on the speed information of the swipe gesture; and
adjusting a playback direction based on the direction information of the swipe gesture.

12. The apparatus of claim 1, further comprising:
a camera; and
the memory and the computer program code further configured to, with the processor, cause the apparatus to:
capture a plurality of consecutive images using the camera;
select an image of the plurality of consecutive images; and
generate the associated video stream for the selected image using at least two of the plurality of consecutive images.

13. The apparatus of claim 12, wherein the selected image is one of the following:
a first image of the plurality of consecutive images;
an intermediate image of the plurality of consecutive images; and
a last image of the plurality of consecutive images.

14. The apparatus of claim 12, wherein selecting the image of the plurality of consecutive images is done by the user.

15. A method for creating a motion effect relating to an image comprising:
maintaining images comprising a first image and a second image in consecutive order for user browsing and associated video streams;
detecting a swipe gesture of a user on a touch sensitive display, wherein the swipe gesture comprises direction and speed information;
selecting the second image based on the direction information of the swipe gesture;
providing a transition from the first image to the second image synchronized with the speed and the direction of the swipe gesture, wherein a video stream associated to the second image is displayed during the transition,
adjusting a playback of the associated video stream based on the direction and the speed information of the swipe gesture;
providing the associated video stream on the display during the swipe gesture, for creating a motion effect relating to the second image; and
providing the second image on the display after the swipe gesture.

16. The method of claim 15, wherein the associated video stream comprises a series of video image frames, and the second image being comprised by one of the video image frames.

17. A computer program product comprising a non-transitory computer readable medium having computer executable program code stored thereon which, when executed by at least one controller of an apparatus, causes the apparatus to:

maintain images comprising a first image and a second image in consecutive order for user browsing and associated video streams;
detect a swipe gesture of a user on a touch sensitive display, wherein the swipe gesture comprises direction and speed information;
select the second image based on the direction information of the swipe gesture;
provide a transition from the first image to the second image synchronized with the speed and the direction of the swipe gesture, wherein a video stream associated to the second image is displayed during the transition;
adjust a playback of the associated video stream based on the direction and the speed information of the swipe gesture;
provide the associated video stream on the display during the swipe gesture, for creating a motion effect relating to the second image; and
provide the second image on the display after the swipe gesture.

* * * * *